US009559567B2

(12) United States Patent
Patterson

(10) Patent No.: US 9,559,567 B2
(45) Date of Patent: Jan. 31, 2017

(54) TURBINE FOR OPERATION IN A FLUID

(71) Applicant: 1564330 Ontario Inc., West Lorne, Ontario (CA)

(72) Inventor: Albert Patterson, West Lorne (CA)

(73) Assignee: 1564330 ONTARIO INC., Ontario (CA)

( * ) Notice: Subject to any disclaimer, the term of this patent is extended or adjusted under 35 U.S.C. 154(b) by 38 days.

(21) Appl. No.: 14/631,039

(22) Filed: Feb. 25, 2015

(65) Prior Publication Data

US 2015/0240776 A1  Aug. 27, 2015

Related U.S. Application Data

(60) Provisional application No. 61/944,379, filed on Feb. 25, 2014.

(51) Int. Cl.
*F03B 3/14* (2006.01)
*H02K 7/18* (2006.01)
*F03B 17/06* (2006.01)

(52) U.S. Cl.
CPC ........... *H02K 7/1823* (2013.01); *F03B 17/067* (2013.01); *F05B 2240/133* (2013.01); *F05B 2260/302* (2013.01); *F05B 2260/506* (2013.01); *Y02E 10/28* (2013.01)

(58) Field of Classification Search
CPC ........ H02K 7/1823; F03B 17/067; F03B 3/12; F03B 3/121; F03B 3/14; F03B 3/145; F03B 17/065; Y02E 10/28
USPC .............................................. 290/52, 43, 54
See application file for complete search history.

(56) References Cited

U.S. PATENT DOCUMENTS

| 4,276,481 A * | 6/1981 | Parker ................... F03B 17/065 290/43 |
| 4,424,451 A * | 1/1984 | Schmidt ................ F03B 17/065 290/54 |
| 5,051,059 A * | 9/1991 | Rademacher ......... F03B 17/062 415/3.1 |
| 7,338,267 B2 | 3/2008 | Patterson |
| 2003/0072668 A1* | 4/2003 | Patterson .............. F01C 1/3441 418/260 |
| 2005/0196299 A1* | 9/2005 | Patterson ............ F01C 21/0809 417/410.3 |

(Continued)

FOREIGN PATENT DOCUMENTS

EP           1 010 891 A1    6/2000

*Primary Examiner* — Viet Nguyen
(74) *Attorney, Agent, or Firm* — Duane Morris LLP; J. Rodman Steele, Jr.; Gregory M. Lefkowitz

(57) ABSTRACT

A turbine is provided, comprising a housing having a fluid inlet and a fluid outlet, each in communication with an internal chamber formed within the housing. A rotor is mounted for rotation within the internal chamber. At least one paddle is pivotally mounted to the rotor for pivoting between an extended position in which the paddle extends substantially radially from the rotor for receiving pressure exerted by fluid moving through the housing and causing the rotor to rotate, and a retracted position in which the paddle does not extend from the rotor. A cam is provided in the internal chamber for moving the paddle from the extended position to the retracted position when, during rotation of the rotor, the paddle moves past the cam in the extended position. Magnetic biasing means may be used to bias the paddle in the extended or retracted position.

14 Claims, 5 Drawing Sheets

(56) References Cited

U.S. PATENT DOCUMENTS

| | | | |
|---|---|---|---|
| 2005/0254968 A1* | 11/2005 | Patterson | F01C 21/0809 417/410.3 |
| 2008/0007067 A1* | 1/2008 | Ryu | F03D 3/068 290/55 |
| 2008/0169654 A1* | 7/2008 | Omer | F03B 7/003 290/4 R |
| 2010/0301609 A1* | 12/2010 | Kim | F03B 17/065 290/54 |
| 2012/0038169 A1* | 2/2012 | Azanza Ladron | H02K 1/278 290/55 |
| 2012/0313376 A1* | 12/2012 | Browning, Jr. | F03B 17/068 290/54 |
| 2012/0319409 A1* | 12/2012 | Schoonover | E21B 41/0085 290/1 R |
| 2013/0333370 A1* | 12/2013 | Hopper | F03B 13/08 60/495 |
| 2014/0217738 A1* | 8/2014 | Lipman | F03B 13/264 290/54 |

\* cited by examiner

TURBINE FOR OPERATION IN A FLUID

CROSS-REFERENCE TO RELATED APPLICATIONS

This application claims priority based on U.S. Patent Application No. 61/944,379 entitled "TURBINE FOR OPERATION IN A FLUID" filed Feb. 25, 2014, which is herein incorporated by reference.

FIELD OF INVENTION

The invention relates to turbines, and in particular, turbines for use in locations having a constant flow of fluid, such as a river.

BACKGROUND

Turbines intended for installation in locations having a constant fluid flow (i.e., locations in which the flow of the fluid that drives the turbine is generally uncontrollable, such as a river bed) are known in the art. Placing turbines in such locations is advantageous, since the constant supply of kinetic energy supplied by the constant fluid flow can be valuable, if harnessed.

Turbines intended for use in such locations generally comprise a housing that allows a portion of the flowing fluid to move an interior thereof. The fluid contacts paddles mounted on a rotor within the housing as it moves through, and causes the rotors to rotate. An output drive shaft of the rotor can be coupled to a driven element, such as an electrical generator, and the rotational motion of the rotor (which is ultimately generated by the movement of the fluid through the turbine) can be used to generate electricity or for other useful purposes.

Some turbines intended for use in locations having constant fluid flow encounter problems when the paddles of the rotor have to move against the flow of the fluid through the turbine, so that the rotor can complete its rotation. When this is the case, the kinetic energy of the fluid flow tends to reduce the amount of rotational energy produced by the turbine.

Another problem is encountered when such turbines must be taken out of service, for example, for maintenance purposes. Since the fluid flow through the turbine generally cannot be controlled, it can be difficult to stop the turbine rotors from rotating. A brake can be applied, but this solution results in a great deal of structural stress being applied to both the rotor and the components of the brake itself.

SUMMARY OF THE INVENTION

The invention provides a turbine for use in locations having constant fluid flow, such as a river bed, in which paddles of the rotor are movable between an extended position and a retracted position. In the extended position, the paddles extend substantially radially from the rotor and catch the fluid flow through the housing of the turbine, urging the rotor to rotate. In the retracted position, the paddles are held against the rotor and do not catch a substantial amount of fluid flow through the housing. A magnetic biasing means co-operates with a cam within the turbine housing to bias the paddle in the extended position, while moving the paddle to the retracted position when the paddle is moving against the flow of fluid through the turbine housing.

In one embodiment, there is provided a turbine comprising a housing having a fluid inlet and a fluid outlet, each in communication with an internal chamber formed within the housing, such that fluid may flow into the internal chamber through the fluid inlet, and out of the internal chamber through the fluid outlet. A rotor is mounted for rotation within the internal chamber. At least one paddle is pivotally mounted to the rotor for pivoting between an extended position in which the paddle extends substantially radially from the rotor for receiving pressure exerted by fluid moving through the housing and causing the rotor to rotate, and a retracted position in which the paddle does not extend from the rotor. A cam is provided in the internal chamber for moving the paddle from the extended position to the retracted position when, during rotation of the rotor, the paddle moves past the cam in the extended position. Magnetic biasing means are provided for biasing the paddle in the extended position.

In another embodiment, there is provided a rotor for a turbine, comprising an axle having an elongate axis, at least one paddle pivotally mounted to the axle for pivoting between an extended position in which the paddle extends substantially radially from the axle for receiving pressure exerted by fluid moving through the housing and causing the axle to rotate about its elongate axis, and a retracted position in which the paddle does not extend from the axle, and magnetic biasing means for biasing the paddle in the extended position.

In some embodiments, the magnetic biasing means can comprise a pair of magnets having the same polarity and arranged such that they are in opposing arrangement when the paddle is in the retracted position. In some embodiments, one of the magnets of the magnetic biasing means can be an electromagnet that can be selectively actuated to bias the paddle in the extended position when the paddle is moving with the flow of fluid through the turbine housing. In some embodiments, the polarity of the electromagnet can be reversed, and the electromagnet can be selectively actuated to bias the paddles in the retracted position, for example, to deactivate the turbine for maintenance purposes.

DETAILED DESCRIPTION OF EMBODIMENTS OF THE INVENTION

Figure 1A:
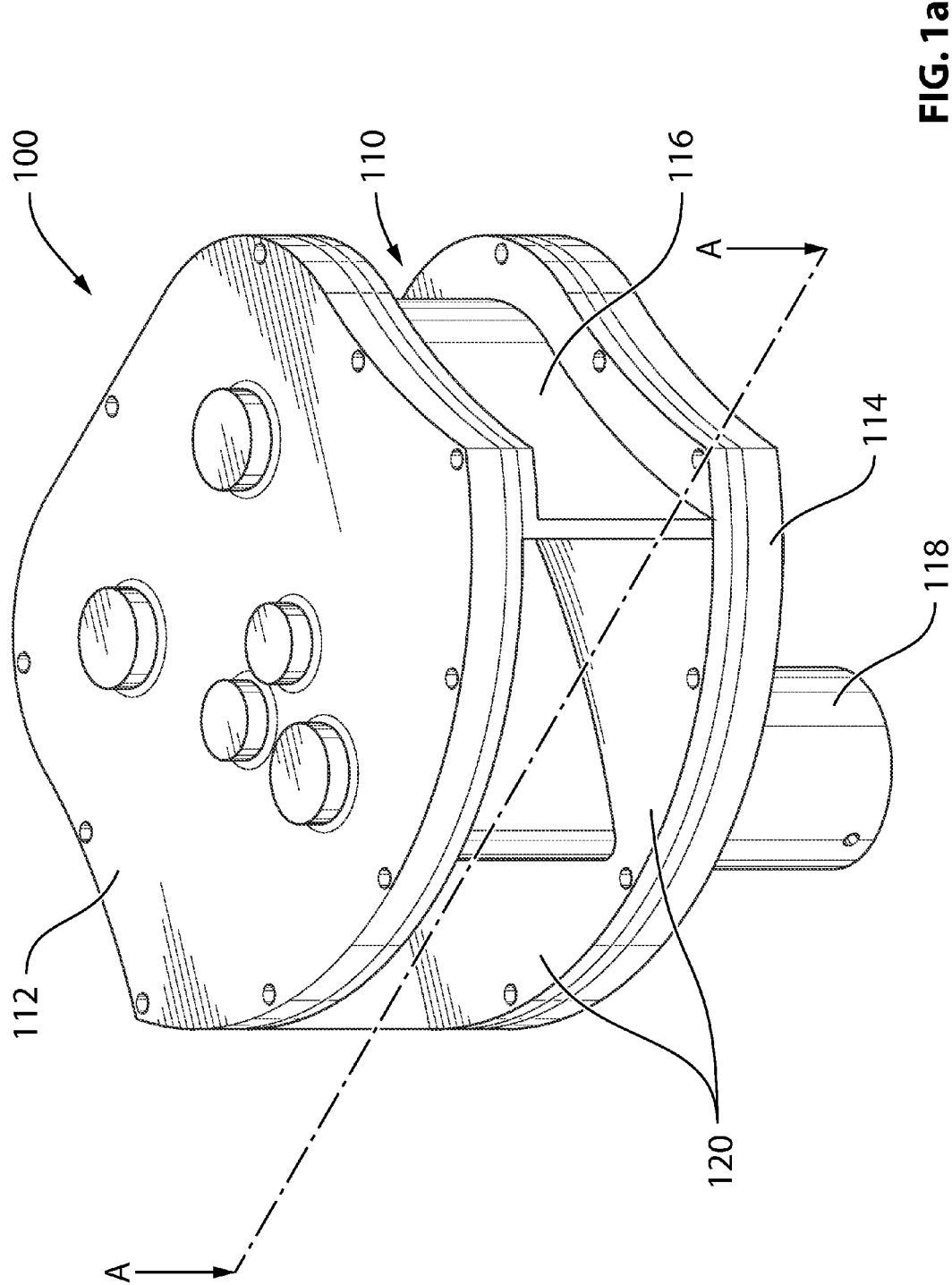
FIGS. 1A and 1B are front and rear perspective views of one embodiment of the turbine of the present invention.
Figure 1B:
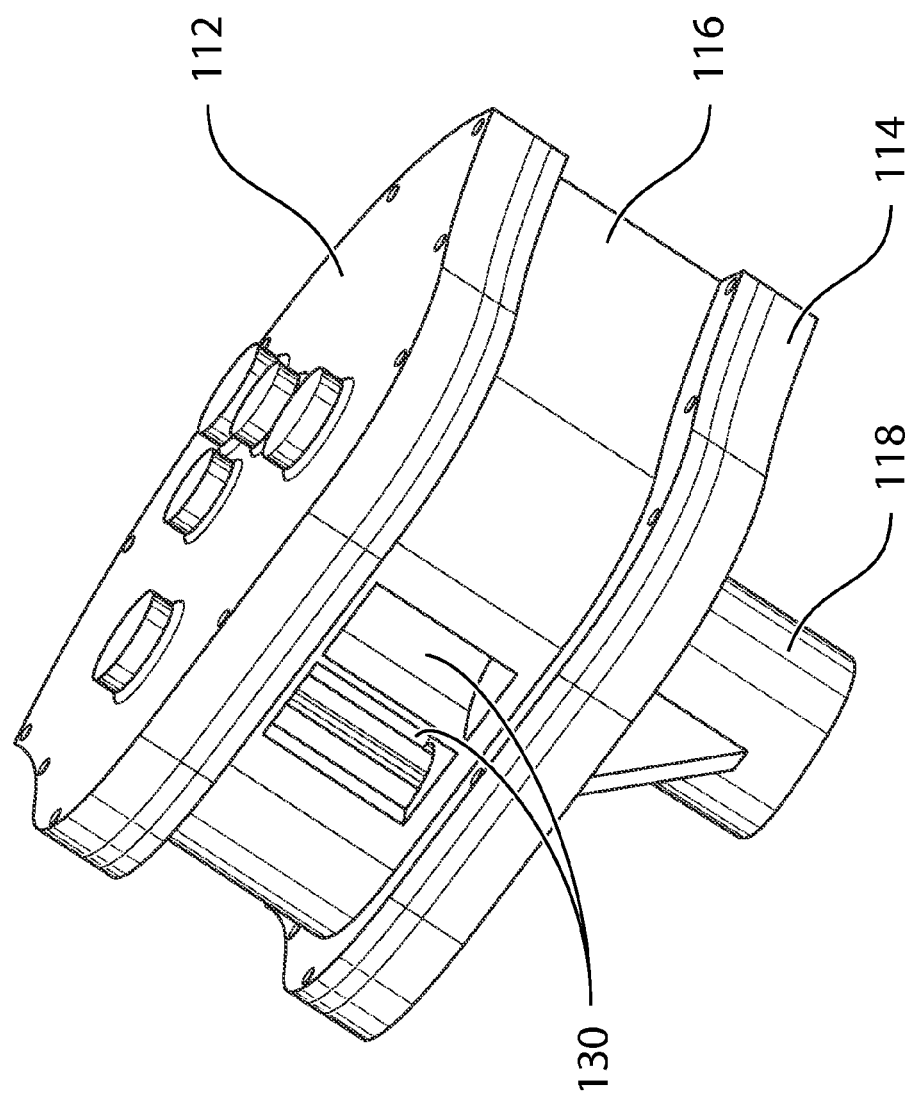

The invention will now be described in greater detail, with reference to the embodiments of the invention depicted in the drawings. FIGS. 1A and 1B depict a turbine 100 in accordance with the present invention. The turbine 100 comprises a housing 110 which has a fluid inlet 120 and a fluid outlet 130.

The housing 110 comprises an upper side 112 and a lower side 114, having a side wall 116 extending therebetween. The upper side 112, lower side 114 and side wall 116 can be made from any material suitable for deployment for extended periods on a river bed for other location at which the turbine will be deployed, such as stainless steel. The housing 110 also comprises a support member 118, which can be made of the same material from which the upper and lower sides 112 and 114, and side wall 116 can be made, for installing the turbine in place on a river bed (or other intended location).

Figure 2:
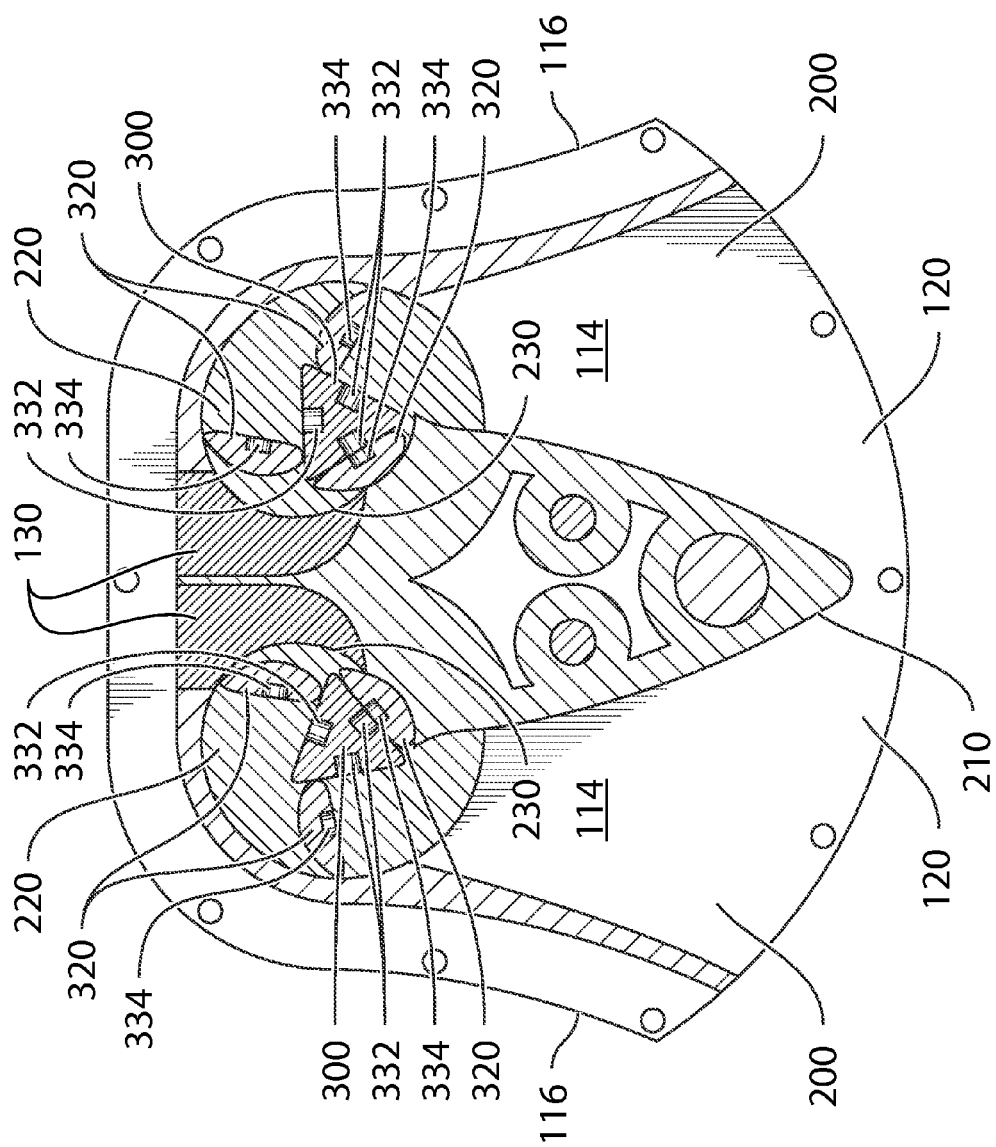
FIG. 2 is a cross-sectional view of the turbine of FIG. 1A, taken along line A-A.

The upper side 112, lower side 114 and side wall 116 form an interior chamber 200, which is depicted in FIG. 2. A foil 210 is provided in the interior space to direct fluid flow toward two rotor spaces 220 at the rear of the interior chamber 200. The foil 210 is formed integrally with the side wall 116 of the turbine 100, but can also be a separate component that is attached to the side wall 116, the upper side 112 and the lower side 114. The foil 210 can be made of any material from which the upper side 112, lower side 114 and side wall 116 can be made.

The rotor spaces 220 are dimensioned to allow rotors to be mounted to rotate therein. The side wall 116 of the housing 100 forms cams 230 in the area of the rotor spaces 220. It will be appreciated that the cams 230 are shaped such that they will cause pivotable paddles provided on the rotors to move from an extended position to a retracted position when the paddles move over the cams 230. The cams 230 also have an outlet port (not shown) formed therein which allows fluid to move through the cam 230 and out of the interior chamber 200 through the fluid outlet 130.

Figure 3:
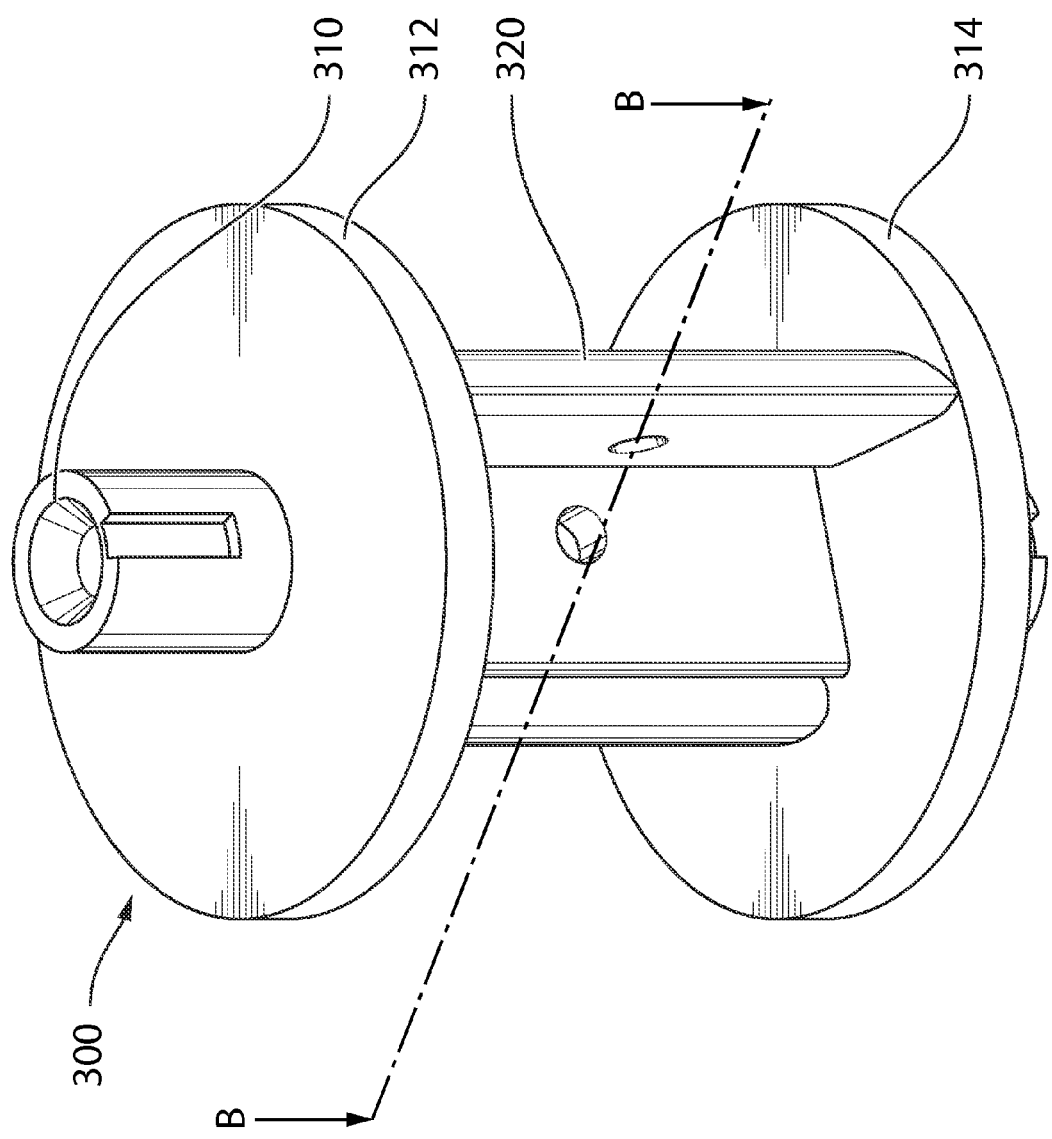
FIG. 3 is a perspective view of a rotor of the turbine of FIG. 1A.
Figure 4:
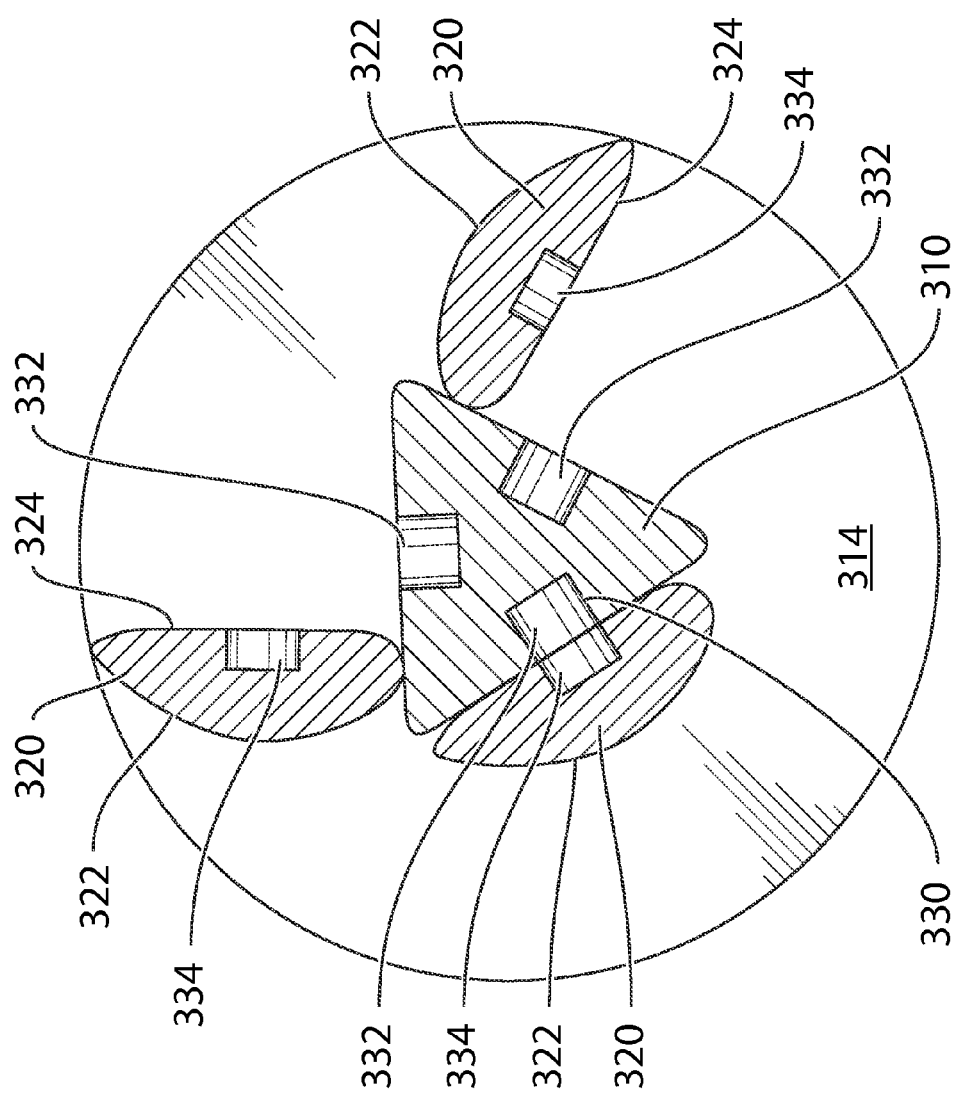
FIG. 4 is a cross-sectional view of the rotor of FIG. 3, taken along line B-B.

Rotors 300 are provided in each of the rotor spaces 220 of the interior chamber 200, an example of which is shown in greater detail in FIGS. 3 and 4. The rotor 300 comprises a central axle 310, which has a triangular cross-section along a central portion of its elongate axis, and a circular cross-section along end portions of its elongate axis. Along its triangular central portion, the axle 310 comprises three faces. The rotor 300 further comprises an upper disc 312 and a lower disc 314 extending radially from the axle 310. The discs 312 and 314 facilitate the mounting of paddles (described below) to the rotor 300, and also add structural strength to the rotor 300.

The rotor 300 further comprises paddles 320 that are pivotally attached to the axle 310. The paddles 320 are each attached to a face of the axle 310 such that the paddles 320 can pivot about an axis that extends along the length of the axle 310 adjacent to one of the apexes of the triangular cross-section of the axle 310. The paddles 320 are free to pivot about their respective axes of rotation between an extended position, wherein the paddle 320 extends radially outward from the face of the axle 310 to which it is attached, and a retracted position, wherein the paddle 320 is parallel to and engages the face of the axle 310 to which it is attached. As well, in some embodiments (not shown) the discs 312 and 314 can have semi-circular sockets formed therein for receiving an end of the paddle 320 and allowing the paddle 320 to move pivotally within the socket between the extended and retracted positions, but not beyond these positions. In other embodiments (not shown), the discs 312 and 314 can have stopping flanges extending therefrom for engaging ends of the paddle 320 when the paddle 320 is in the extended position. Either the sockets or the stopping flanges can be used to prevent the paddle 320 from pivoting beyond the extended position, and to support the paddle 320 against force exerted on it by fluid moving through the turbine 100 when the paddle 320 is in the extended position.

The paddles 320 have a semi-elliptical cross section, wherein one face 322 of the paddle 320 has a convex curvature, whereas the other face 324 of the paddle 320 is flat. This shape allows the paddle 320 to take full advantage of the force exerted by the fluid when the paddle 320 is in the extended position. The shape also allows the paddle not to impede the flow of fluid past the rotor 300 when the paddle 320 is in the retracted position.

The rotor 300 has a magnetic biasing means 330 for biasing the paddle 320 in the extended position. The magnetic biasing means 330 comprises a first magnet 332 mounted on the face of the axle 310, and a second magnet 334 mounted on the flat face 324 of the paddle 320. The first and second magnets 332 and 334 are mounted such that they are directly opposing one another when the paddle 320 is in the retracted position.

The first and second magnets 332 and 334 are of the same polarity, such that they repel one another. Therefore, when the paddle 320 is placed in the retracted position and the first and second magnets 332 and 334 are directly opposed to one another, a strong repulsive force is exerted on each magnet 332 and 334, which urges the paddle 320 to move away from the retracted position and toward the extended position. It will be appreciated that, the closer the paddle 320 comes to the fully retracted position, the stronger the force of repulsion forcing it back toward the extended position will become.

In the embodiment depicted in the drawings, the magnets 332 and 334 are ordinary magnets having a constant polarity. However, it will be appreciated that any sort of magnet can be used, including rare earth magnets and electromagnets. In the case of electromagnets, actuating means can be used to control the flow of current to the electromagnet can be employed, thus allowing users to control the precise moment at which a paddle 320 in the retracted position can be urged into the extended position. One example of actuating means is a microcontroller programmed to selectively activate and deactivate the flow of electrical current to the electromagnet, and the polarity of said electrical current.

As well, in embodiments having electromagnets controlled by actuating means, the current provided to the electromagnet can be reversed, thus reversing the polarity of the electromagnet. Thus, the magnetic biasing means 330 can be selectively changed from one that biases the paddle 320 in the extended position to one that biases the paddle 320 in the retracted position. This functionality can be used, for example, to take the turbine offline, for example for maintenance purposes. By holding the paddles 320 in the retracted position, substantially all of the force from the fluid can be removed from the rotors 300, essentially stopping all rotational movement of the rotors 300. This feature can be used in conjunction with a brake (not shown) to eliminate any residual rotational movement of the rotors 300 that may exist.

In operation, as fluid enters the interior chamber 200 through the fluid inlet 120 and is directed to the rotor spaces 220 by the foil 210, the fluid engages the paddles 320, which causes the rotors 300 to rotate. As the rotors 300 rotate, both the fluid and the paddles 320 move in a circular path through the rotor spaces 220 (clockwise in the case of the rotor space 220 on the left hand side of FIG. 2, and counter-clockwise in the case of the rotor space 220 on the right hand side of FIG. 2). As the paddles 320 reach the cams 230, the cams 230 engage the paddles 320, causing the paddles 320 to move from the extended position to the retracted position as the paddles 320 move along the cams 230. As well, once the paddles 320 are past the outlet ports of the cams 230, the fluid moves through the outlet ports of the cams 230 and out of the interior chamber 200 through the fluid outlet 130.

As the paddles 320 move along the cams 230 and rotate into the retracted position, the magnets 332 and 334 are moved into opposing engagement, giving rise to a magnetic force urging the paddles 320 back into the extended position.

As long as the paddles 320 are engaging the cams 230, the paddles cannot move toward the extended position and are held in the retracted position, despite the force exerted by the magnets 332 and 334. This allows the rotors 300 to complete their rotation without the paddles 320 moving against the flow of fluid through the turbine.

Once the paddles 320 have rotated past the end of the cams 230, the paddles 320 are free to move under the force of the magnets 332 and 334 back to the extended position. Once in the extended position, the paddles 320 engage the fluid flow through the interior chamber 200 once again, and are rotated through the rotor spaces 220 under the force exerted by the fluid once again.

The embodiments of the invention described above are intended to be exemplary. The present invention should not be understood to be limited to these exemplary embodiments. Rather, it will be apparent to those of skill in the art that various modifications, additions and omissions may be made to the exemplary embodiments described above without departing from the scope of the invention as defined by the claims that follow, which are to given the broadest interpretation consistent with the specification as a whole.

The invention claimed is:

1. A turbine, comprising
a housing having a fluid inlet and a fluid outlet, the fluid inlet and the fluid outlet in communication with an internal chamber formed within the housing, such that fluid may flow into the internal chamber through the fluid inlet, and out of the internal chamber through the fluid outlet;
a rotor mounted for rotation within the internal chamber;
at least one paddle pivotally mounted to the rotor for pivoting between an extended position in which the paddle extends substantially radially from the rotor for receiving pressure exerted by fluid moving through the housing and causing the rotor to rotate, and a retracted position in which the paddle does not extend from the rotor;
a cam provided in the internal chamber for moving the paddle from the extended position to the retracted position when, during rotation of the rotor, the paddle moves past the cam in the extended position; and
magnetic biasing means for selectively biasing the paddle in the extended position, the magnetic biasing means comprising a first magnet having a polarity provided on the paddle, and a second magnet provided on the rotor, the second magnet having the same polarity as the first magnet such that when the paddle is in the retracted position the first magnet and the second magnet are in opposing arrangement.

2. The turbine of claim 1, wherein one of the first magnet and the second magnet comprises an electromagnet.

3. The turbine of claim 2, further comprising means for selectively activating and deactivating the electromagnet.

4. The turbine of claim 3, wherein the means for selectively activating and deactivating the electromagnet activates the electromagnet when the paddle is in the retracted position and after the paddle has passed the cam, and deactivates the electromagnet once the paddle has moved to the extended position.

5. The turbine of claim 3, wherein the means for selectively activating and deactivating the electromagnet can reverse the polarity of the electromagnet to bias the paddle in the retracted position.

6. The turbine of claim 1 wherein the cam is formed integrally with a wall of the interior chamber.

7. The turbine of claim 1 wherein the cam is positioned within the housing such that, when the paddle is moving in a direction opposite to the flow of fluid through the interior chamber, the cam moves the paddle to the retracted position.

8. The turbine of claim 1, further comprising an output shaft in rotational engagement with the rotor, for rotationally connecting a driven element to the rotor.

9. The turbine of claim 8, further comprising a set of gears in rotational engagement with the output shaft, for connecting the driven element to the rotor for rotation at a different rate than that of the rotor.

10. The turbine of claim 8, wherein the driven element comprises an electrical generator.

11. A rotor for a turbine, comprising
an axle having an elongate axis;
at least one paddle pivotally mounted to the axle for pivoting between an extended position in which the paddle extends substantially radially from the axle for receiving pressure exerted by fluid moving in the vicinity of the rotor and causing the axle to rotate about its elongate axis, and a retracted position in which the paddle does not extend from the axle; and
magnetic biasing means for selectively biasing the paddle in the extended position, the magnetic biasing means comprising a first magnet having a polarity provided on the paddle, and a second magnet provided on the axle, the second magnet having the same polarity as the first magnet such that, when the paddle is in the retracted position, the first magnet and the second magnet are in opposing arrangement.

12. The rotor of claim 11, wherein one of the first magnet and the second magnet comprises an electromagnet.

13. The rotor of claim 12, further comprising means for selectively activating and deactivating the electromagnet.

14. The rotor of claim 13, wherein the means for selectively activating and deactivating the electromagnet can reverse the polarity of the electromagnet to bias the paddle in the retracted position.

* * * * *